(12) United States Patent
Ahn et al.

(10) Patent No.: US 9,736,820 B2
(45) Date of Patent: *Aug. 15, 2017

(54) METHOD AND DEVICE FOR TRANSMITTING CONTROL INFORMATION

(71) Applicant: LG ELECTRONICS INC., Seoul (KR)

(72) Inventors: Joonkui Ahn, Anyang-si (KR);
Suckchel Yang, Anyang-si (KR);
Mingyu Kim, Anyang-si (KR);
Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 200 days.

This patent is subject to a terminal disclaimer.

(21) Appl. No.: 14/700,840

(22) Filed: Apr. 30, 2015

(65) Prior Publication Data

US 2015/0237611 A1    Aug. 20, 2015

Related U.S. Application Data

(63) Continuation of application No. 13/822,624, filed as application No. PCT/KR2011/006611 on Sep. 7, 2011, now Pat. No. 9,055,574.

(Continued)

(51) Int. Cl.
*H04W 72/04* (2009.01)
*H04L 5/00* (2006.01)
(Continued)

(52) U.S. Cl.
CPC ...... *H04W 72/0406* (2013.01); *H04B 7/0413* (2013.01); *H04L 1/1812* (2013.01); *H04L 5/0055* (2013.01)

(58) Field of Classification Search
CPC .............. H04W 72/1289; H04W 52/04; H04L 5/0055; H04L 5/0053; H04L 1/1812;
(Continued)

(56) References Cited

U.S. PATENT DOCUMENTS

2009/0207797 A1    8/2009   Shen et al.
2009/0245194 A1   10/2009   Damnjanovic et al.
(Continued)

FOREIGN PATENT DOCUMENTS

EP          2214340       8/2010
WO        2010/018978     2/2010

OTHER PUBLICATIONS

PCT International Application No. PCT/KR2011/006611, Written Opinion of the International Searching Authority dated Feb. 24, 2012, 17 pages.

(Continued)

*Primary Examiner* — Jung-Jen Liu
(74) *Attorney, Agent, or Firm* — Lee Hong Degerman Kang Waimey

(57) ABSTRACT

The present invention relates to a wireless communication system. Specifically, the present invention relates to a method for transmitting uplink control information and to an apparatus for the same. The present invention relates to a method and to a device for said method which comprises the steps of selecting one uplink control channel resource corresponding to a plurality of HARQ-ACKs from among a plurality of uplink control channel resources, and transmitting a bit value corresponding to the plurality of HARQ-ACKs by using the selected uplink control channel resource.

4 Claims, 17 Drawing Sheets

Related U.S. Application Data

(60) Provisional application No. 61/382,458, filed on Sep. 13, 2010, provisional application No. 61/383,307, filed on Sep. 15, 2010.

(51) Int. Cl.
*H04L 1/18* (2006.01)
*H04B 7/0413* (2017.01)

(58) Field of Classification Search
CPC ... H04L 5/0042; H04L 5/0094; H04L 1/1861; H04L 5/001
See application file for complete search history.

(56) References Cited

U.S. PATENT DOCUMENTS

| | | | |
|---|---|---|---|
| 2009/0287976 A1 | 11/2009 | Wang et al. | |
| 2010/0031111 A1 | 2/2010 | Cai et al. | |
| 2010/0159935 A1 | 6/2010 | Cai et al. | |
| 2011/0170499 A1* | 7/2011 | Nayeb Nazar | H04L 1/1812 370/329 |
| 2011/0243039 A1* | 10/2011 | Papasakellariou | H04L 1/1861 370/280 |
| 2011/0261679 A1* | 10/2011 | Li | H04L 1/1812 370/216 |
| 2011/0299490 A1 | 12/2011 | Nordstrom et al. | |
| 2011/0305213 A1* | 12/2011 | Lohr | H04L 1/1887 370/329 |
| 2011/0310819 A1* | 12/2011 | Liao | H04L 1/1614 370/329 |
| 2012/0057545 A1 | 3/2012 | Hariharan et al. | |
| 2012/0176884 A1 | 7/2012 | Zhang et al. | |

OTHER PUBLICATIONS

The State Intellectual Property Office of the People's Republic of China Application Serial No. 201180044059.5, Office Action dated Dec. 3, 2014, 8 pages.

LTE, "Evolved Universal Terrestrial Radio Access (E-UTRA), Physical Layer Procedures (3GPP TS 36.213 version 8.6.0 Release 8)," ETSI TS 136 213 V8.6.0, Apr. 2009, 79 pages.

Deutsches Patent—und Markenamt Application No. 112011103063.0, Office Action dated Jan. 7, 2015, 12 pages.

Texas Instruments, "Resource Allocation for A/N Transmission on PUCCH", R1-104466, 3GPP TSG RAN WG1 #62, Aug. 2010, 4 pages.

Samsung, "PUCCH HARQ-ACK Resource Mapping for DL CA", R1-103637, 3GPP TSG RAN WG1 #61bis, Jun. 2010, 3 pages.

Pantech, "UL PUCCH A/N resource allocation for CA", R1-104632, 3GPP TSG RAN1 #62, Aug. 2010, 4 pages.

Huawei, "Resource allocation for uplink ACK/NACK multiplexing", R1-104282, 3GPP TSG RAN WG1 Meeting #62, Aug. 2010, 5 pages.

PCT International Application No. PCT/KR2011/006611, Written Opinion of the International Searching Authority dated Feb. 24, 2012, 9 pages.

LG Electronics, "Resource Allocation for Multi-antenna Transmission in PUCCH Format 1/1a/1b", R1-100644, 3GPP TSG RAN WG1 Meeting #59bis, Jan. 2010, 4 pages.

* cited by examiner

METHOD AND DEVICE FOR TRANSMITTING CONTROL INFORMATION

CROSS-REFERENCE TO RELATED APPLICATIONS

This application is a continuation of U.S. patent application Ser. No. 13/822,624, filed on Mar. 12, 2013, now U.S. Pat. No. 9,055,574, which is the National Stage filing under 35 U.S.C. 371 of International Application No. PCT/KR2011/006611, filed on Sep. 7, 2011, which claims the benefit of U.S. Provisional Application Nos. 61/382,458, filed on Sep. 13, 2010, and 61/383,307, filed on Sep. 15, 2010, the contents of which are all hereby incorporated by reference herein in their entirety.

TECHNICAL FIELD

The present invention relates to a wireless communication system, and more particularly, to a method and apparatus for transmitting control information.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method of efficiently transmitting uplink control information and an apparatus therefor in a wireless communication system. Another object of the present invention is to provide a method of efficiently transmitting control information, preferably, ACK/NACK information in a multicarrier situation and an apparatus therefor.

It will be appreciated by persons skilled in the art that the objects that could be achieved with the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for transmitting uplink control information by a communication apparatus configured with a plurality of cells in a wireless communication system, the method including: receiving a plurality of PDCCH (Physical Downlink Control Channel) signals on one cell; receiving a plurality of PDSCH (Physical Downlink Shared Channel) signals indicated by the plurality of PDCCH signals; generating a plurality of HARQ ACKs (Hybrid Automatic Repeat request-Acknowledgements) corresponding to the plurality of PDSCH signals; and transmitting bit values corresponding to the plurality of HARQ ACKs using one of a plurality of PUCCH (Physical Uplink Control Channel) resources, wherein the plurality of PUCCH resources includes a plurality of first PUCCH resources linked to a resource index for transmission of each PDCCH signal and at least one second PUCCH resource configured by a higher layer.

In another aspect of the present invention, provided herein is a communication apparatus configured to transmit uplink control information when a plurality of cells is configured in a wireless communication system, the communication apparatus including a radio frequency (RF) unit, and a processor, wherein the processor is configured to receive a plurality of PDCCH (Physical Downlink Control Channel) signals on one cell, to receive a plurality of PDSCH (Physical Downlink Shared Channel) signals indicated by the plurality of PDCCH signals, to generate a plurality of HARQ ACKs (Hybrid Automatic Repeat request-Acknowledgements) corresponding to the plurality of PDSCH signals, and to transmit bit values corresponding to the plurality of HARQ ACKs using one of a plurality of PUCCH (Physical Uplink Control Channel) resources, wherein the plurality of PUCCH resources includes a plurality of first PUCCH resources linked to a resource index for transmission of each PDCCH signal and at least one second PUCCH resource configured by a higher layer.

At least one of the plurality of PDCCH signals may include resource indication information for HARQ-ACK and the resource indication information for HARQ-ACK may be used to change the at least one second PUCCH resource.

The resource indication information for HARQ-ACK may include an offset value.

The resource indication information for HARQ-ACK may be included in a TPC (Transmit Power Control) field of a PDCCH signal corresponding to a PDSCH signal transmitted on a secondary cell.

At least one of the plurality of PDCCH signals may include resource indication information for HARQ-ACK, and the resource indication information may include information indicating the at least one second PUCCH resource from a second PUCCH resource candidate set configured by the higher layer.

The first PUCCH resources may be indicated using a lowest CCE (Control Channel Element) index for transmission of a corresponding PDCCH signal.

The plurality of PDCCH signals may be received on a primary cell.

Advantageous Effects

According to the present invention, uplink control information can be efficiently transmitted in a wireless communication system. Furthermore, control information, preferably, ACK/NACK information can be efficiently transmitted in a multicarrier situation.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

Figure 1:
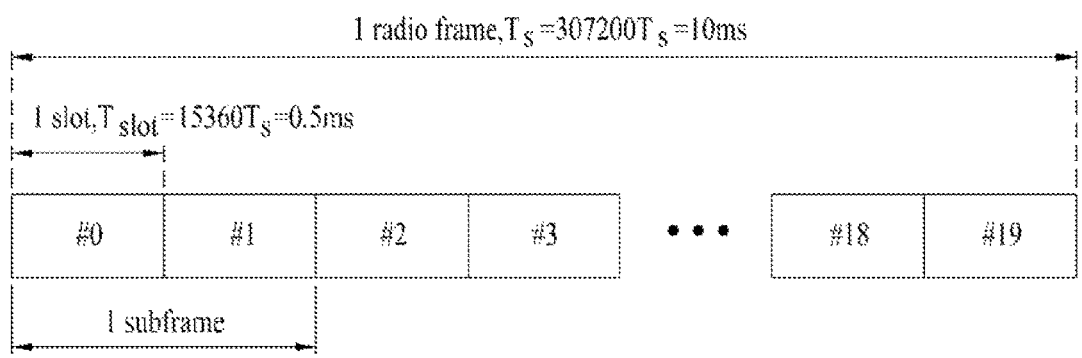
FIG. 1 illustrates a radio frame structure.

FIG. 1 illustrates a radio frame structure.

Referring to FIG. 1, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) or single carrier frequency division multiple access (SC-FDMA) symbols in time domain. Since LTE uses the OFDMA in the downlink and uses SC-FDMA in the uplink, an OFDM or SC-FDMA symbol represents one symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 2:
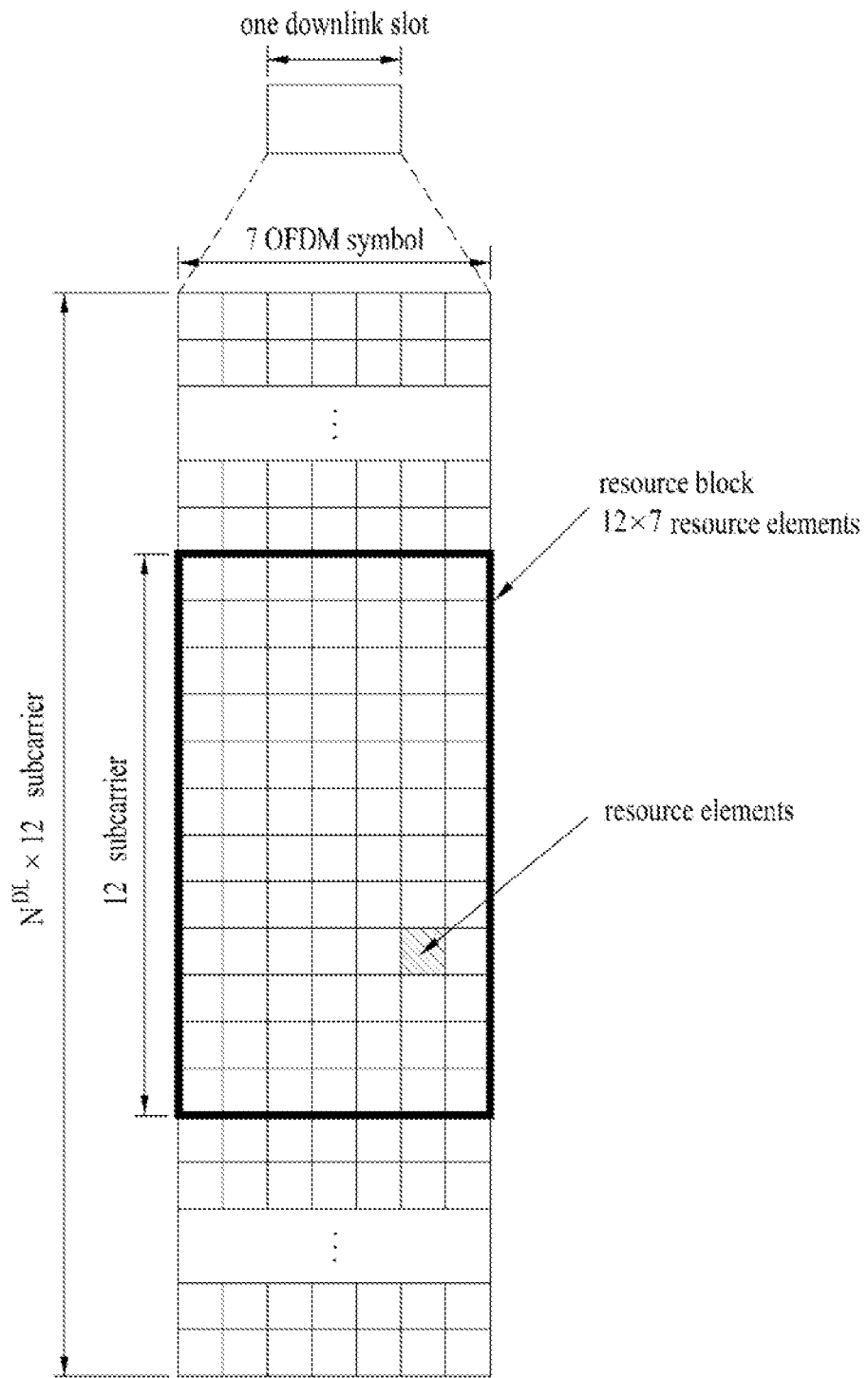
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number NRB of RBs included in the downlink slot depends on a downlink transmit bandwidth. The structure of an uplink slot may be same as that of the downlink slot except that OFDM symbols by replaced by SC-FDMA symbols.

Figure 3:
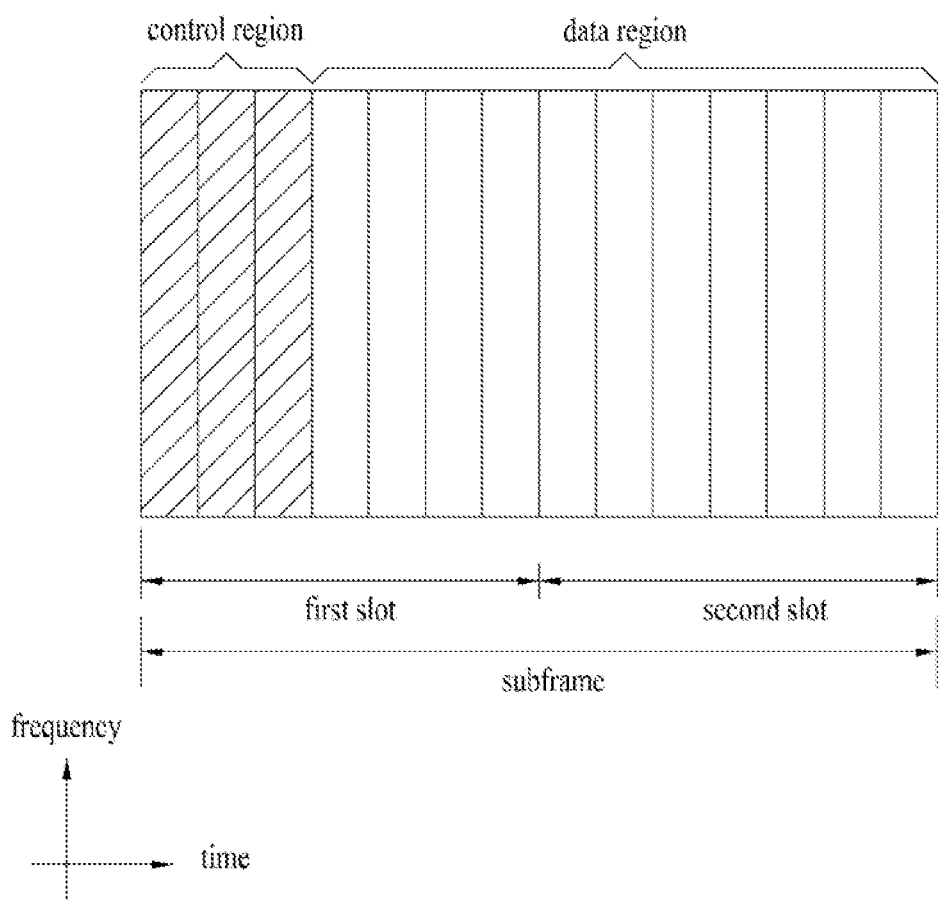
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode

Transmission mode 1: Transmission from a single base station antenna port

Transmission mode 2: Transmit diversity

Transmission mode 3: Open-loop spatial multiplexing

Transmission mode 4: Closed-loop spatial multiplexing

Transmission mode 5: Multi-user MIMO

Transmission mode 6: Closed-loop rank-1 precoding

Transmission mode 7: Transmission using UE-specific reference signals

DCI Format

Format 0: Resource grants for the PUSCH transmissions (uplink)

Format 1: Resource assignments for single codeword PDSCH transmissions (transmission modes 1, 2 and 7)

Format 1A: Compact signaling of resource assignments for single codeword PDSCH (all modes)

Format 1B: Compact resource assignments for PDSCH using rank-1 closed loop precoding (mod 6)

Format 1C: Very compact resource assignments for PDSCH (e.g. paging/broadcast system information)

Format 1D: Compact resource assignments for PDSCH using multi-user MIMO (mode 5)

Format 2: Resource assignments for PDSCH for closed-loop MIMO operation (mode 4)

Format 2A: Resource assignments for PDSCH for open-loop MIMO operation (mode 3)

Format 3/3A: Power control commands for PUCCH and PUSCH with 2-bit/1-bit power adjustments As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
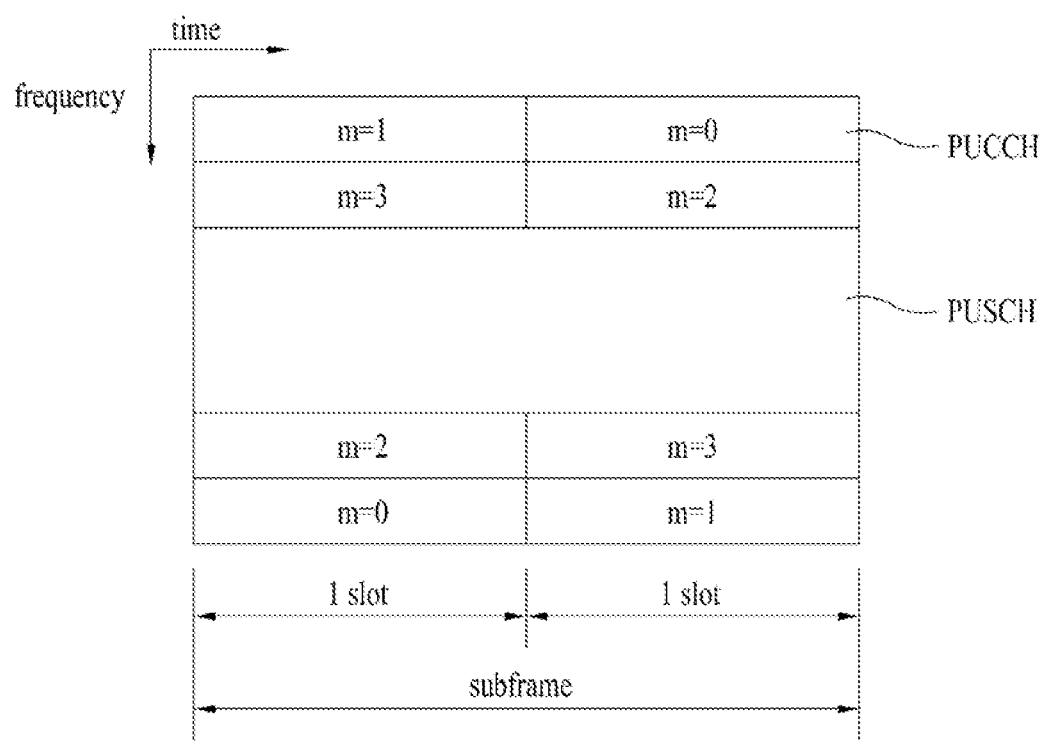
FIG. 4 illustrates an uplink subframe structure.

FIG. 4 illustrates an uplink subframe structure. Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI) and Precoding Matrix Indicator (PMI). 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 1 shows the mapping relationship between PUCCH formats and UCI in LTE.

TABLE 1

| PUCCH format | UCI (Uplink Control Information) |
| --- | --- |
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

Figure 5:
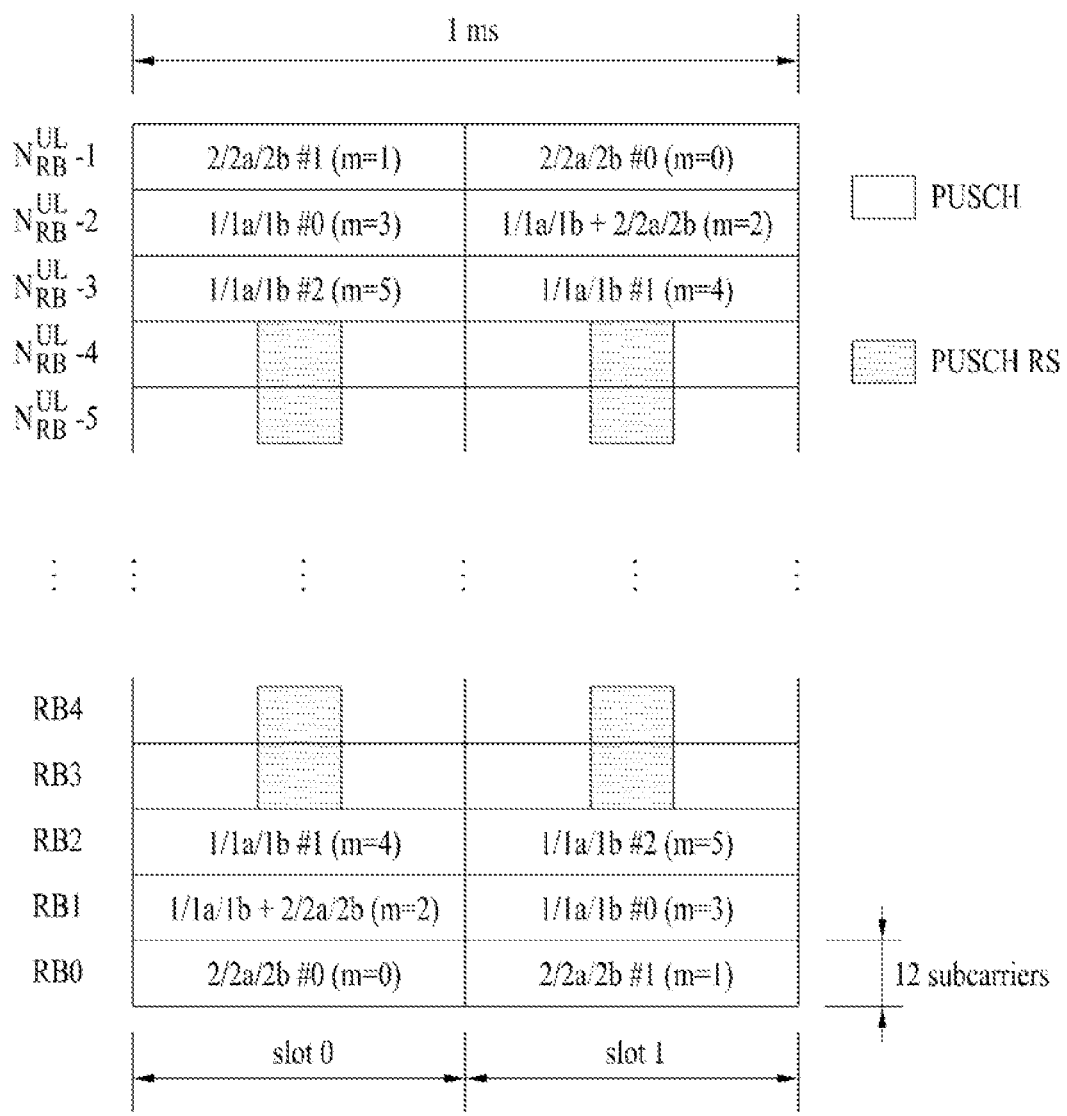
FIG. 5 illustrates an example of physically mapping a PUCCH format to a PUCCH region.

FIG. 5 illustrates an example of physically mapping a PUCCH format to a PUCCH region.

Referring to FIG. 5, PUCCH formats are mapped onto RBs in the order of PUCCH formats 2/2a/2b (CQI) (e.g. PUCCH regions m=0, 1), PUCCH formats 2/2a/2b (CQI) or PUCCH formats 1/1a/1b (SR/HARQ ACK/NACK) (e.g. PUCCH region m=2 if present), and PUCCH formats 1/1a/1b (SR/HARQ ACK/NACK) (e.g. PUCCH regions m=3, 4, 5), starting from the band-edge, and transmitted. The number of PUCCH RBs, $N_{RB}^{(2)}$, which can be used for PUCCH formats 2/2a/2b (CQI) is signaled to a UE in a cell through broadcast signaling.

The periodicity and frequency resolution to be used by a UE to report CQI are both controlled by the BS. In the time domain, both periodic and aperiodic CQI reporting are supported. The PUCCH format 2 is used for periodic CQI reporting. In periodic CQI reporting, CQI is piggybacked on data and then transmitted through a PUSCH if the PUSCH is scheduled for a subframe reserved for CQI transmission. A PUSCH is used for aperiodic CQI reporting, whereby the BS specifically instructs the UE to send an individual CQI report embedded into a resource which is scheduled for uplink data transmission.

Figure 6:
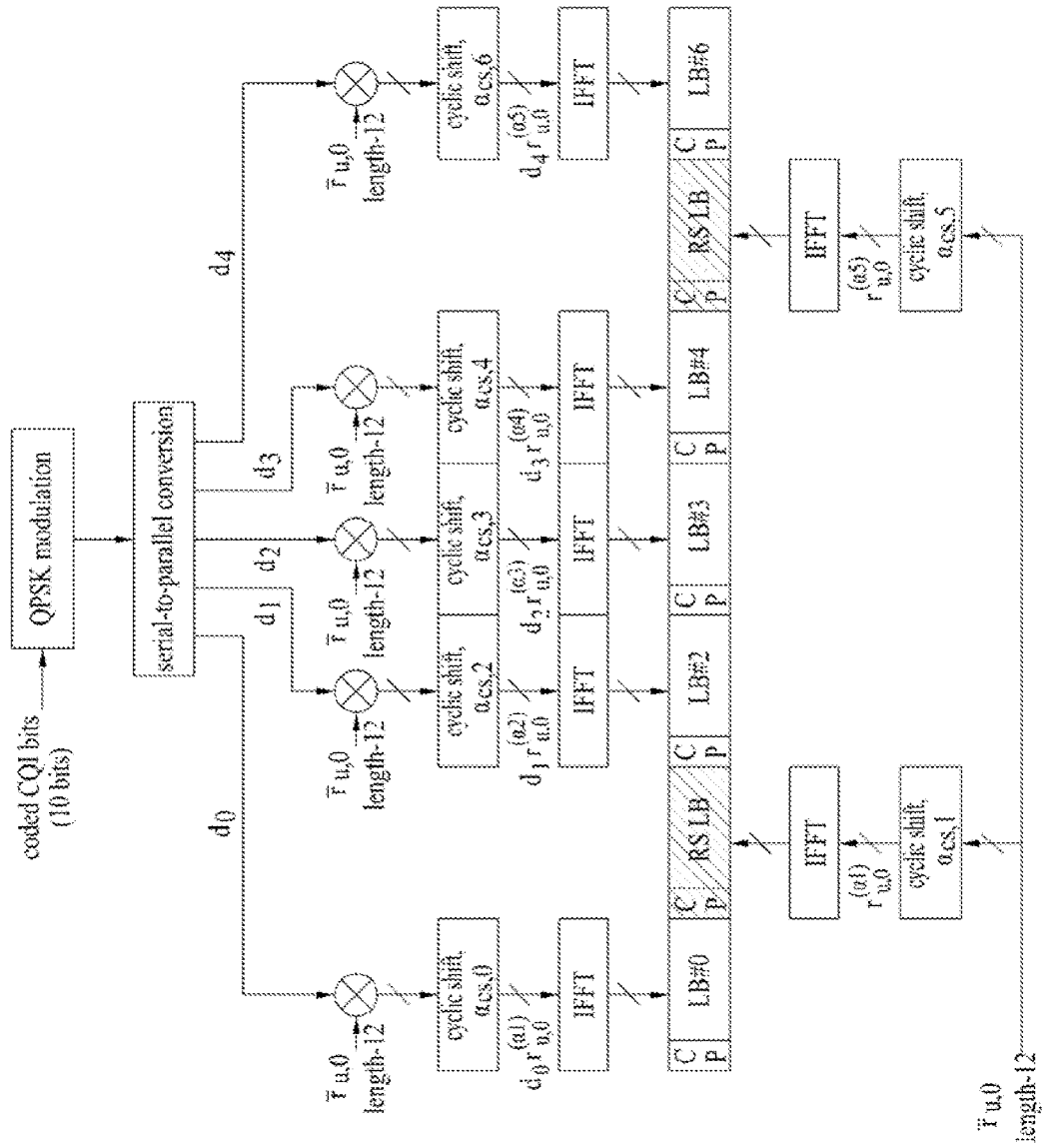
FIG. 6 illustrates a slot level structure of PUCCH format 2/2a/2b.

FIG. 6 illustrates a slot level structure of PUCCH formats 2/2a/2b. The PUCCH formats 2/2a/2b are used for CQI transmission. In the case of normal CP, SC-FDMA symbols #1 and #5 in a slot are used for transmission of a Demodulation Reference Signal (DM RS). In the case of extended CP, only SC-FDMA #3 in the slot is used for DM RS transmission.

Referring to FIG. 6, at a subframe level, 10-bit CSI is channel-coded into 20 coded bits using (20, k) Reed-Muller code punctured at a rate of 1/2 (not shown). The coded bits are scrambled (not shown) and then mapped to Quadrature Phase Shift Keying (QPSK) constellation (QPSK modulation). Scrambling can be performed using length-31 gold sequence in a similar manner that PUSCH data is scrambled. 10 QPSK modulation symbols are generated according to the QPSK modulation, and 5 QPSK modulation symbols $d_0$, $d_1$, $d_2$, $d_3$ and $d_4$ are transmitted through SC-FDMA symbols corresponding thereto in each slot. Each of the QPSK modulation symbols is used to modulate a length-12 base RS sequence $r_{u,0}$ prior to being subjected to Inverse Fast Fourier Transform (IFFT). Consequently, the RS sequence is cyclic-shifted in the time domain according to the QPSK modulation symbol value ($d_x*r_{u,0}^{(\alpha x)}$, x=0 to 4). The RS sequence multiplied by the QPSK modulation symbol is cyclic-shifted ($\alpha_{cs,x}$, x=1,5). When the number of cyclic shifts is N, N UEs can be multiplexed on the same CSI PUCCH RB. While a DM RS sequence is similar to a CSI sequence in the frequency domain, the DM RS sequence is not modulated by a CQI modulation symbol.

Parameters/resources for periodic CQI reports are configured semi-statically according to higher layer (e.g. Radio Resource Control (RRC)) signaling. If PUCCH resource index $n_{PUCCH}^{(2)}$ is set for CQI transmission, for example, CQI is periodically transmitted on a CQI PUCCH linked to PUCCH resource index $n_{PUCCH}^{(2)}$. PUCCH resource index $n_{PUCCH}^{(2)}$ indicates a PUCCH RB and cyclic shift $\alpha_{cs}$.

Figure 7:
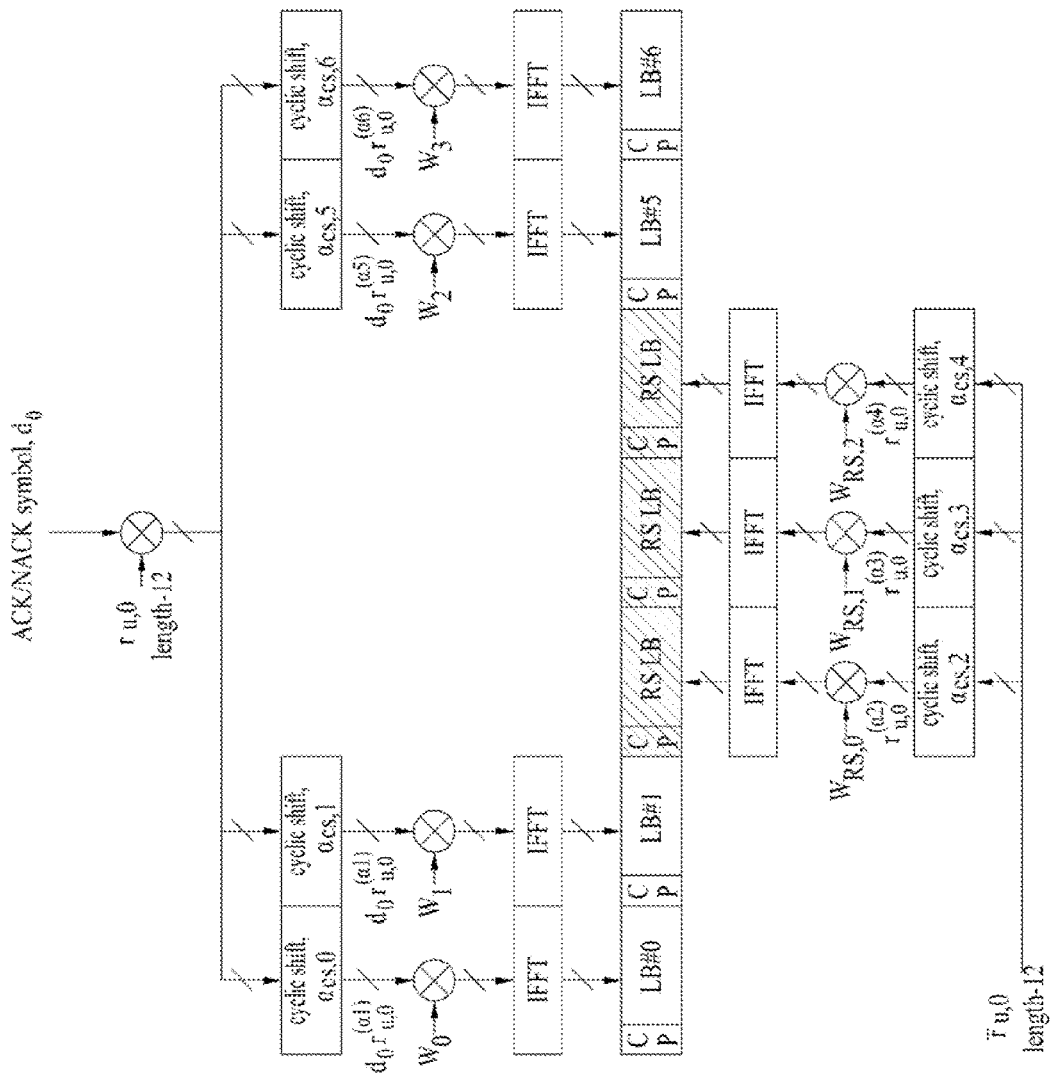
FIG. 7 illustrates a slot level structure of PUCCH format 1a/1b.

FIG. 7 illustrates a slot level structure of PUCCH formats 1a/1b. The PUCCH formats 1a/1b are used for ACK/NACK transmission. In the case of normal CP, SC-FDMA symbols #2, #3 and #4 are used for DM RS transmission. In the case of extended CP, SC-FDMA symbols #2 and #3 are used for DM RS transmission. Accordingly, 4 SC-FDMA symbols in a slot are used for ACK/NACK transmission. PUCCH format 1a/1b is called PUCCH format 1 for convenience.

Referring to FIG. 7, 1-bit [b(0)] and 2-bit [b(0)b(1)] ACK/NACK information are modulated according to BPSK and QPSK modulation schemes respectively, to generate one ACK/NACK modulation symbol do. Each bit [b(i), i=0, 1] of the ACK/NACK information indicates a HARQ response to a corresponding DL transport block, corresponds to 1 in the case of positive ACK and corresponds to 0 in case of negative ACK (NACK). Table 2 shows a modulation table defined for PUCCH formats 1a and 1b in LTE.

TABLE 2

| PUCCH format | b(0), . . ., b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

PUCCH formats 1a/1b perform time domain spreading using an orthogonal spreading code $W_0$, $W_1$, $W_2$, $W_3$, (e.g. Walsh-Hadamard or DFT code) in addition to cyclic shift $\alpha_{cs,x}$ in the frequency domain. In the case of PUCCH formats 1a/1b, a larger number of UEs can be multiplexed on the same PUCCH RB because code multiplexing is used in both frequency and time domains.

RSs transmitted from different UEs are multiplexed using the same method as is used to multiplex UCI. The number of cyclic shifts supported by SC-FDMA symbols for PUCCH ACK/NACK RB can be configured by cell-specific higher layer signaling parameter $\Delta_{shift}^{PUCCH}$. $\Delta_{shift}^{PUCCH} \in \{1, 2, 3\}$ represents that shift values are 12, 6 and 4, respectively. In time-domain CDM, the number of spreading codes actually used for ACK/NACK can be limited by the number of RS symbols because multiplexing capacity of RS symbols is less than that of UCI symbols due to a smaller number of RS symbols.

Figure 8:
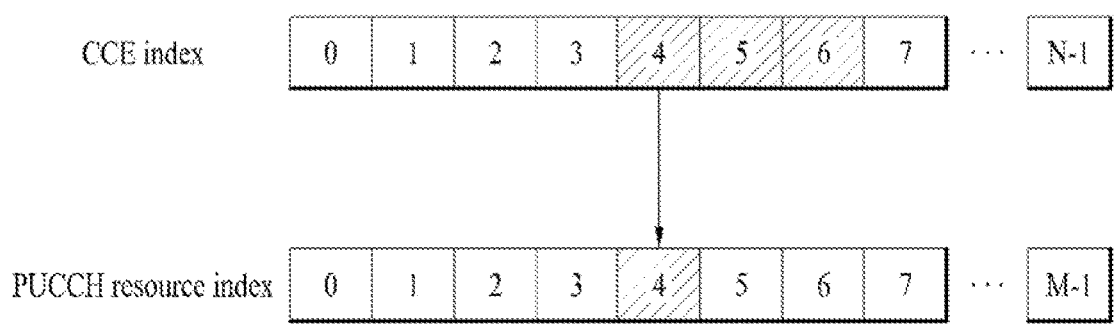
FIG. 8 illustrates an example of determining a PUCCH resource for ACK/NACK.

FIG. 8 illustrates an example of determining PUCCH resources for ACK/NACK. In LTE, a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data involving the ACK/NACK signal is delivered. The region in which the PDCCH is transmitted in a DL subframe is configured with a plurality of Control Channel Elements (CCEs), and the PDCCH transmitted to the UE is composed of one or more CCEs. The UE transmits the ACK/NACK signal through a PUCCH resource corresponding to a specific one (e.g. first CCE) of the CCEs constituting the received PDCCH.

Referring to FIG. 8, each block in a Downlink Component Carrier (DL CC) represents a CCE and each block in an Uplink Component Carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 8, a UE transmits an ACK/NACK signal on PUCCH #4 corresponding to CCE #4, the first CCE of the PDCCH. FIG. 8 illustrates a case in which maximum M PUCCHs are present in the UL CC when maximum N CCEs exist in the DL CC. Though N can equal M, N may differ from M and CCEs are mapped to PUCCHs in an overlapped manner.

Specifically, a PUCCH resource index in LTE is determined as follows.

$$n^{(1)}_{PUCCH} = n_{CCE} + N^{(1)}_{PUCCH} \quad \text{[Equation 1]}$$

Here, $n^{(1)}_{PUCCH}$ represents a resource index of PUCCH format 1 for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal spreading code and a Physical Resource Block (PRB) for PUCCH formats 1a/1b are obtained from $n^{(1)}_{PUCCH}$.

When an LTE system operates in TDD, a UE transmits one multiplexed ACK/NACK signal for a plurality of PDSCHs received through subframes at different timings. Specifically, the UE transmits one multiplexed ACK/NACK signal for a plurality of PDSCHs using an ACK/NACK channel selection scheme (PUCCH selection scheme). The ACK/NACK channel selection scheme is also referred to as a PUCCH selection scheme. When the UE receives a plurality of DL data in the ACK/NACK channel selection scheme, the UE occupies a plurality of UL physical channels in order to transmit a multiplexed ACK/NACK signal. For example, when the UE receives a plurality of PDSCHs, the UE can occupy the same number of PUCCHs as the PDSCHs using a specific CCE of a PDCCH which indicates each PDSCH. In this case, the UE can transmit a multiplexed ACK/NACK signal using combination of which one of the occupied PUCCHs is selected and modulated/coded results applied to the selected PUCCH.

Table 3 shows an ACK/NACK channel selection scheme defined in LTE.

TABLE 3

| HARQ-ACK(0), HARQ-ACK(1), HARQ-ACK(2), HARQ-ACK(3) | $n^{(1)}_{PUCCH,\,X}$ | Subframe b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 3, HARQ-ACK(i) indicates the HARQ ACK/NACK/DTX result of an i-th data unit ($0 \leq i \leq 3$). DTX (Discontinuous Transmission) represents that there is no transmission of a data unit corresponding to HARQ-ACK(i) or the UE does not detect the data unit corresponding to HARQ-ACK(i). In the specification, HARQ-ACK and ACK/NACK are interchangeably used. Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 3, $n^{(1)}_{PUCCH,X}$ represents a PUCCH resource actually used for ACK/NACK transmission, and b(0)b(1) indicates two bits transmitted through the selected PUCCH resource, which are modulated using QPSK. For example, when the UE has decoded 4 data units successfully, the UE transmits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except in some cases (NACK/DTX, N/D).

In LTE-A, a plurality of PUCCH resources may be considered for ACK/NACK transmission for a single PDCCH. For example, when a transmit diversity scheme using multiple antennas on uplink is applied, the same ACK/NACK signal needs to be transmitted on different PUCCH resources for different antennas. In this case, the first PUCCH index can be determined by the first CCE index used for transmission of a corresponding PDCCH, similarly to LTE. However, LTE does not define a method of allocating PUCCH indexes other than the first PUCCH index.

Figure 9:
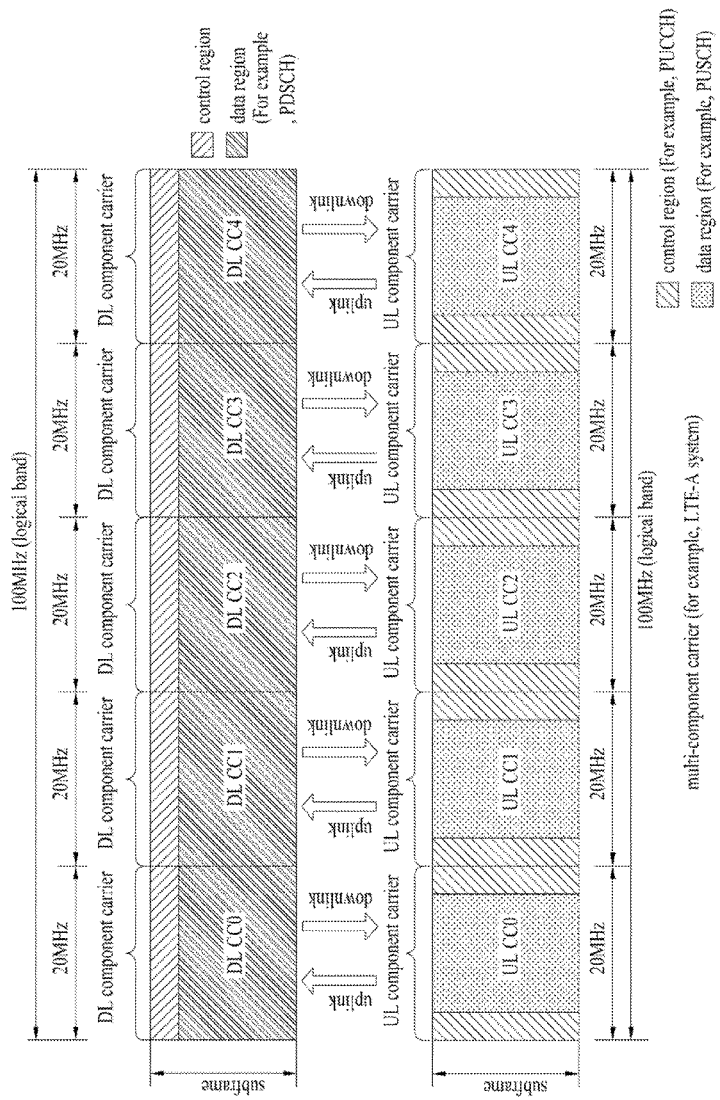
FIG. 9 illustrates a carrier aggregation (CA) communication system.

FIG. 9 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 9, a plurality of UL/DL CCs can be aggregated to support a wider UL/DL bandwidth. The CCs may be contiguous or non-contiguous in the frequency domain. Bandwidths of the CCs can be independently determined Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

Figure 10:
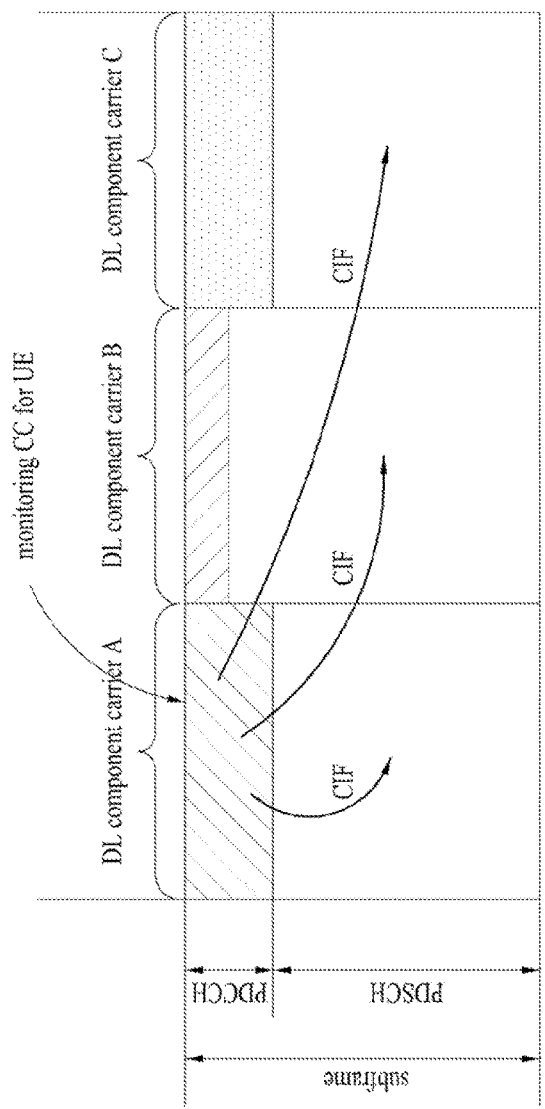
FIG. 10 illustrates scheduling in case of aggregation of a plurality of carriers.

FIG. 10 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs. In this case, DL CC B and DL CC C that are not set to PDCCH CCs do not deliver PDCCHs. Accordingly, the DL CC A (PDCCH CC) needs to include all of a PDCCH search space relating to the DL CC A, a PDCCH search space relating to the DL CC B and a PDCCH search space relating to the DL CC C.

LTE-A considers transmission of a plurality of ACK/NACK information/signals with respect to a plurality of PDSCHs, which are transmitted through a plurality of DL CCs, through a specific UL CC (e.g. UL PCC or UL PCell). For description, it is assumed that a UE operates in a SU-MIMO (Single User-Multiple Input Multiple Output) mode in a certain DL CC to receive 2 codewords (or transport blocks). In this case, the UE needs to be able to transmit 4 feedback states, ACK/ACK, ACK/NACK, NACK/ACK and NACK/NACK, or up to 5 feedback states including even DTX for the DL CC. If the DL CC is set to support a single codeword (or transport block), up to 3 states of ACK, NACK and DTX are present for the DL CC. Accordingly, if NACK and DTX are processed as the same state, a total of 2 feedback states of ACK and NACK/DTX are present for the DL CC. Accordingly, if the UE aggregates a maximum of 5 DL CCs and operates in the SU-MIMO mode in all CCs, the UE can have up to 55 transmittable feedback states and an ACK/NACK payload size for representing the feedback states corresponds to 12 bits. If DTX and NACK are processed as the same state, the number of feedback states is 45 and an ACK/NACK payload size for representing the same is 10 bits.

To achieve this, LTE-A discusses transmission of a plurality of ACK/NACK information/signals using PUCCH format 1a/1b and ACK/NACK multiplexing (i.e. ACK/NACK selection) in a multi-carrier situation. Here, schemes by which each UE secures a plurality of PUCCH resources for ACK/NACK transmission can be classified into an implicit scheme and an explicit scheme. The implicit scheme allocates a PUCCH resource linked to a PDCCH that schedules a PDSCH to a UE as in LTE (refer to Equation 1). The explicit scheme pre-allocates a PUCCH resource to be used by the UE through RRC signaling. Accordingly, a scheme of using an implicit resource, an explicit resource or a combination of an implicit resource and an explicit resource may be considered for ACK/NACK channel selection.

The present invention proposes a method of changing a PUCCH resource allocated to a UE for ACK/NACK transmission by transmitting an ARI (ACK/NACK Resource Index) through a PDSCH-scheduling PDCCH to avoid collision between PUCCH resources for ACK/NACK transmission of UEs. Furthermore, the present invention proposes a scheme of applying an ARI according to a combination of implicit/explicit PUCCH resources allocated to a UE.

It is assumed that 2 DL CCs are configured for a UE and the UE receives up to 2 MIMO codewords (e.g. TBs) through a PDSCH of each DL CC in the following description. In addition, it is assumed that a plurality of ACK/NACKs is transmitted using ACK/NACK channel selection. For this, it is assumed that the UE occupies 4 PUCCH resources such that the UE can transmit up to 4-bit ACK/NACK information corresponding to up to 4 codewords (or TBs). In addition, it is assumed that the UE is allocated a PUCCH resource for ACK/NACK transmission only in a specific UL CC (e.g. UL PCC) (e.g. UL CC linked to a DL PCC) although it receives a PDSCH-scheduling PDCCH through a plurality of DL CCs. The above assumption is for aiding in description of the present invention and the present invention is not limited thereto. The present invention is applicable to a case in which an arbitrary number of DL CCs are configured for a UE and the UE receives an arbitrary number of MIMO codewords through each DL CC and uses a number of PUCCH resources necessary to receive the MIMO codewords.

The following description illustrates a case in which 2 PUCCH resources are secured for one PDCCH on the assumption that up to 2 MIMO codewords (e.g. TBs) are received through a PDSCH using each DL CC. This is also applicable to a case in which a maximum of one codeword (e.g. TB) is received through a PDSCH using each DL CC and an ACK/NACK signal is transmitted using a multi-antenna transmission scheme (e.g. transmit diversity). For example, 2 PUCCH resources can be secured for one PDCCH for 2Tx transmission.

In the following description, a PCC PDCCH means a PDCCH received on a PCC or a PDCCH corresponding to a PDSCH received on an SCC. Similarly, an SCC PDCCH means a PDCCH received on an SCC or a PDCCH corresponding to a PDSCH received on the SCC. A CC is interchangeably used with a cell, the PCC is interchangeably used with PCell and the SCC is interchangeably used with SCell.

Figure 11:
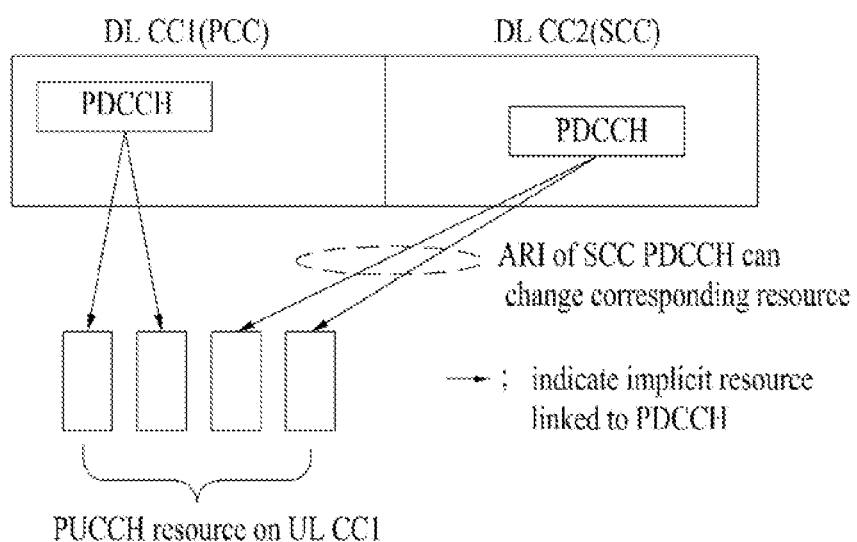
FIGS. 11 to 16 illustrate ACK/NACK resource allocation methods according to embodiments of the present invention.

Embodiment 1: Case in which PDCCHs are Transmitted Through a Plurality of PDCCH Monitoring CCs and Implicit Resources are Used for all PDCCHs FIG. 11 illustrates a method of allocating PUCCH resources for ACK/NACK transmission. The present embodiment exemplifies a case in which implicit resources are used for all PDCCHs.

Referring to FIG. 11, the UE can receive PDSCH-scheduling PDCCHs through a plurality of DL CCs. The figure shows a case in which one PDCCH is received on each of a PCC and an SCC. The UE receives a PDSCH signal corresponding to each PDCCH. In a MIMO mode, up to 2 codewords can be transmitted through each PDSCH. In the present embodiment, the UE can be allocated 2 PUCCH resources linked to each PDCCH such that the UE can transmit ACK/NACK(s) for up to 4 codewords. The UE feeds back a plurality of ACK/NACKs using ACK/NACK channel selection. That is, the UE transmits bit values corresponding to a plurality of ACK/NACKs using one of the plural PUCCH resources.

The 2 PUCCH resources linked to a PDCCH may be a PUCCH resource linked to a first CCE (i.e. CCE index=$n_{CCE}$) constituting the PDCCH and a PUCCH resource linked to a CCE (i.e. CCE index=$n_{CCE}+1$) contiguous to the first CCE. Here, if PUCCH resources for ACK/NACK transmission for two DL CCs are shared for the corresponding UL CC, instead of being separately secured for the respective DL CCs, PUCCH resources linked to a PCC PDCCH may collide with PUCCH resources linked to an SCC PDCCH.

Accordingly, the present embodiment proposes a scheme of changing a PUCCH resource linked to a PDCCH through ARI information signaled through the PDCCH when implicit PUCCH resources linked to PDCCHs transmitted through different PDCCH monitoring CCs are used for ACK/NACK transmission. For example, the PUCCH resource linked to the PDCCH can be changed by a specific offset through the ARI information. The ARI information may be used for a case in which the PUCCH resource is not changed and a case in which the PUCCH resource is changed by one of one or more offset values. The ARI information may be included only in an SCC PDCCH to change only the position of a PUCCH resource linked to the SCC PDCCH. Otherwise, the ARI information may be included only in a PCC PDCCH to change only the position of a PUCCH resource linked to the PCC PDCCH. Alternatively, the ARI information may be included in both the PCC PDCCH and SCC PDCCH.

When a plurality of PDCCHs includes ARI information, ARI information included in each PDCCH may be applied only to PUCCH resources linked to the corresponding PDCCH. For example, when SCC PDCCHs are transmitted through a plurality of SCCs, ARI information included in each SCC PDCCH can be applied to PUCCH resources linked to the corresponding PDCCH. That is, ARI information of the SCC PDCCHs can be independently set.

An ARI (e.g. an offset value) can be used to change a PUCCH index. A changed cyclic shift, a changed orthogonal cover and/or a changed PRB can be obtained from the changed PUCCH index. In addition the ARI (e.g. offset value) can be used to directly change at least one of a cyclic shift, an orthogonal cover and a PRB.

Equation 2 represents an example of changing implicit PUCCH resource(s) using ARI information. This example can be applied to changing implicit PUCCH resource(s) in the following embodiments in a similar way. PCC PDCCH $$n^{(1)}_{PUCCH,1} = n_{CCE,PCC} + N^{(1)}_{PUCCH}n$$

$$n^{(1)}_{PUCCH,2} = n_{CCE,PCC} + 1 + N^{(1)}_{PUCCH}$$

SCC PDCCH $$n^{(1)}_{PUCCH,3} = n_{CCE,SCC} + a + N^{(1)}_{PUCCH}$$

$$n^{(1)}_{PUCCH,4} = n_{CCE,SCC}a + 1 + N^{(1)}_{PUCCH} \quad \text{[Equation 2]}$$

Here, $n^{(1)}_{PUCCH,x}$ (x=1,2,3,4) denotes a PUCCH resource index, $n_{CCE,PCC}$ denotes a lowest CCE index corresponding to a CCE constituting a PCC PDCCH, and $n_{CCE,SCC}$ represents a lowest CCE index corresponding to a CCE constituting an SCC PDCCH. $N^{(1)}_{PUCCH}$ is a signaling value transmitted from a higher layer (e.g. RRC) and $\alpha$ is an offset value according to an ARI.

Offsets for PUCCH index #3 ($n^{(1)}_{PUCCH,3}$) and PUCCH index #4 ($n^{(1)}_{PUCCH,4}$) may be independently provided.

Figure 12:
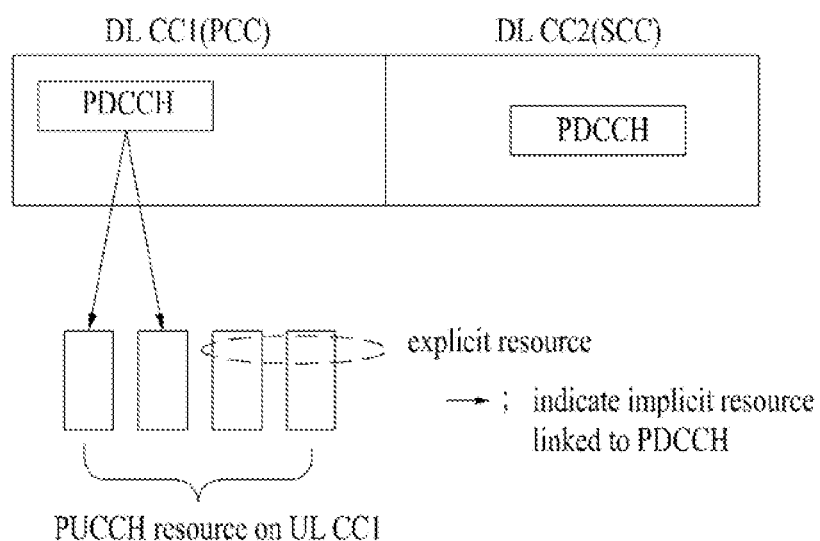

Embodiment 2: Case in which an Implicit Resource is Used for a Specific DL CC from Among a Plurality of PDCCH Monitoring CCs and Explicit Resources are Used for the Remaining DL CCs FIG. 12 illustrates a method of allocating PUCCH resources for ACK/NACK transmission. The present embodiment exemplifies a case in which an implicit PUCCH resource is used for a PDCCH transmitted through a specific DL CC (e.g. PCC) and explicit PUCCH resources are used for PDCCHs transmitted through the remaining DL CC(s).

Referring to FIG. 12, the UE can receive PDSCH-scheduling PDCCHs through a plurality of DL CCs. The figure shows a case in which one PDCCH is received on each of a PCC and an SCC. The UE receives a PDSCH signal corresponding to each PDCCH. In a MIMO mode, up to 2 codewords can be transmitted through each PDSCH. In the present embodiment, 2 PUCCH resources linked to a PCC PDCCH can be allocated to the UE for ACK/NACK transmission for 2 codewords (or TBs) transmitted through a PDSCH scheduled by the PCC PDCCH. For 2 codewords (or TBs) transmitted through a PDSCH scheduled by an SCC PDCCH, 2 explicit PUCCH resources can be pre-allocated to the UE for ACK/NACK transmission. The UE feeds back a plurality of ACK/NACKs using ACK/NACK channel selection. That is, the UE transmits bit values corresponding to a plurality of ACK/NACKs using one of the plural PUCCH resources.

To reduce the quantity of PUCCH resources necessary for the system, the same explicit PUCCH resource can be allocated to a plurality of UEs. In this case, the explicit PUCCH resource can be changed/indicated using ARI information included in a PDCCH. The ARI information may be included in a PCC PDCCH and/or an SCC PDCCH. The ARI information is preferably included in a PDCCH (e.g. a PDCCH transmitted through an SCC) which is not used to designate an implicit PUCCH resource.

The ARI information can include an offset value used to change an explicit PUCCH resource, for example. In this case, the ARI information can be used to change a PUCCH index. A changed cyclic shift, a changed orthogonal cover and/or a changed PRB can be obtained from the changed PUCCH index. In addition the ARI (e.g. offset value) can be used to directly change at least one of a cyclic shift, an orthogonal cover and a PRB.

Table 4 shows explicit PUCCH resources according to the present embodiment. In the table, the higher layer includes the RRC (Radio Resource Control) layer. The present embodiment can be applied to a case in which an explicit PUCCH resource is changed in the following embodiments.

TABLE 4

| ARI (2 bits) | PUCCH index #1 | PUCCH index #2 |
| --- | --- | --- |
| 00 | The 1-1st PUCCH resource value configured by the higher layers | The 1-2st PUCCH resource value configured by the higher layers |
| 01 | The 1-1st PUCCH resource value + $\alpha_{1,1}$ | The 1-2st PUCCH resource value + $\alpha_{2,1}$ |
| 10 | The 1-1st PUCCH resource value + $\alpha_{1,2}$ | The 1-2st PUCCH resource value + $\alpha_{2,2}$ |
| 11 | The 1-1st PUCCH resource value + $\alpha_{1,3}$ | The 1-2st PUCCH resource value + $\alpha_{2,3}$ |

In the table, $\alpha_{1,1} \sim \alpha_{2,3}$ denote offsets according to ARI values.

The ARI information can indicate different explicit PUCCH resource sets. An explicit resource set corresponds to a plurality of explicit resources allocated per PDCCH. For example, the explicit resource set includes a PUCCH resource pair.

Table 5 shows explicit PUCCH resources according to the present embodiment. The present embodiment can be applied to a case in which an explicit PUCCH resource is indicated in the following embodiments in a similar way.

TABLE 5

| ARI (2 bits) | PUCCH index #1 | PUCCH index #2 |
| --- | --- | --- |
| 00 | The 1-1st PUCCH resource value configured by the higher layers | The 1-2st PUCCH resource value configured by the higher layers |
| 01 | The 2-1nd PUCCH resource value configured by the higher layers | The 2-2nd PUCCH resource value configured by the higher layers |
| 10 | The 3-1rd PUCCH resource value configured by the higher layers | The 3-2rd PUCCH resource value configured by the higher layers |
| 11 | The 4-1th PUCCH resource value configured by the higher layers | The 4-2th PUCCH resource value configured by the higher layers |

When a plurality of SCC PDCCHs is transmitted and explicit PUCCH resources are used for the same, each SCC PDCCH can include ARI information. Here, the SCC PDCCHs may have the same ARI information (e.g. PUCCH resource offset value or PUCCH resource set). Alternatively, the SCC PDCCHs may include independent ARIs.

The above-described embodiments describe the method of changing/designating only implicit information (embodiment 1) or only explicit information (embodiment 2) through the ARI information. However, the ARI information can also be used to selectively designate/change an implicit resource or an explicit resource. For example, the ARI information can indicate whether an implicit resource linked to a corresponding PDCCH is used (embodiment 1) or an explicit resource is used (embodiment 2). Alternatively, for 2 implicit PUCCH resources linked to a PDCCH, the ARI information can indicate whether the corresponding PUCCH resources are used or explicit resources are used. Alternatively, the ARI information can designate one of an implicit resource derived from the corresponding PDCCH, one or more resource set(s) represented as offsets with respect to the implicit resource, and one explicit resource set. Furthermore, the ARI information can designate one of an implicit resource and a plurality of explicit resource sets (or an explicit resource set and resources determined by offsets with respect to the explicit resource set) derived from the PDCCH. In addition, the ARI information can indicate one of an implicit resource derived from the PDCCH, one or more resource set(s) represented as offsets with respect to the implicit resource, and a plurality of explicit resource sets (or an explicit resource set and resources determined by offsets with respect to the explicit resource set).

Figure 13:
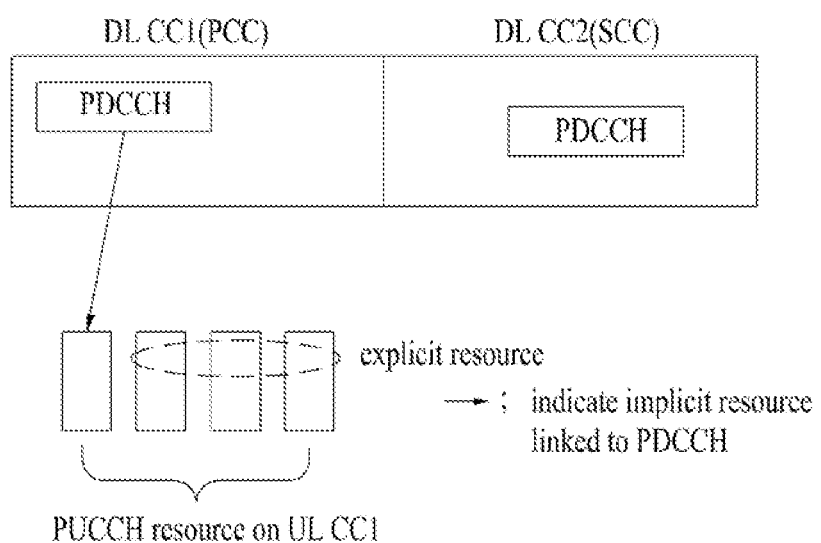

Embodiment 3: Case in which a Combination of an Implicit Resource and an Explicit Resource is Used for a Specific DL CC from Among a Plurality of PDCCH Monitoring CCs and Explicit Resources are Used for the Remaining DL CCs FIG. 13 illustrates a method of allocating PUCCH resources for ACK/NACK transmission. The present embodiment exemplifies a case in which an implicit PUCCH resource is allocated for a PDCCH that schedules MIMO transmission of 2 codewords transmitted through a specific DL CC (e.g. PCC) and remaining PUCCH resources are allocated in an explicit manner.

Referring to FIG. 13, the UE can receive PDSCH-scheduling PDCCHs through a plurality of DL CCs. The figure shows a case in which one PDCCH is received on each of a PCC and an SCC. The UE receives a PDSCH signal corresponding to each PDCCH. In a MIMO mode, up to 2 codewords can be transmitted through each PDSCH. In the present embodiment, one PUCCH resource linked to a PCC PDCCH can be allocated to the UE for ACK/NACK transmission for 2 codewords (or TBs) transmitted through a PDSCH scheduled by the PCC PDCCH. The remaining 3 PUCCH resources can be pre-allocated to the UE in an explicit manner. The UE feeds back a plurality of ACK/NACKs using ACK/NACK channel selection. That is, the UE transmits bit values corresponding to a plurality of ACK/NACKs using one of the plural PUCCH resources.

To reduce the quantity of PUCCH resources necessary for the system, the same explicit PUCCH resource can be allocated to a plurality of UEs. In this case, the explicit PUCCH resource can be changed/indicated using ARI information included in a PDCCH. The ARI information may be included in a PCC PDCCH and/or an SCC PDCCH. The ARI information is preferably included in a PDCCH (e.g. a PDCCH transmitted through an SCC) which is not used to designate an implicit PUCCH resource.

The ARI information can include an offset value used to change an explicit PUCCH resource, for example (refer to Table 4). In this case, the ARI information can be used to change a PUCCH index. A changed cyclic shift, a changed orthogonal cover and/or a changed PRB can be obtained from the changed PUCCH index. In addition the ARI (e.g. offset value) can be used to directly change at least one of a cyclic shift, an orthogonal cover and a PRB. Furthermore, the ARI information can designate different explicit PUCCH resource sets (refer to Table 5). An explicit resource set corresponds to a plurality of explicit resources allocated per PDCCH. For example, the explicit resource set includes a PUCCH resource pair.

A PUCCH resource changed by an ARI may correspond to some of all explicit PUCCH resources. For example, one of 3 explicit PUCCH resources shown in FIG. 13 can be used only for mapping of ACK/NACK information with respect to a PDSCH scheduled on the PCC. In this case, ARI information of the SCC PDCCH may not be applied to the corresponding PUCCH resource. This can avoid generation of an error in an ACK/NACK response to the PDSCH transmitted on the PCC when the UE misses the SCC PDCCH.

When a plurality of SCC PDCCHs is transmitted and explicit PUCCH resources are used for the same, each SCC PDCCH can include ARI information. Here, the SCC PDCCHs may have the same ARI information (e.g. PUCCH resource offset value or PUCCH resource set). Otherwise, the SCC PDCCHs may include independent ARIs.

The above-described embodiments describe a method of changing/designating only implicit information (embodiment 1) or only explicit information (embodiment 3) through the ARI information. However, the ARI information can also be used to selectively designate/change an implicit resource or an explicit resource. For example, the ARI information can indicate whether an implicit resource linked to the corresponding PDCCH is used (embodiment 1) or an explicit resource is used (embodiment 3). Preferably, for 2 implicit PUCCH resources linked to a PDCCH, the ARI information can indicate whether the corresponding PUCCH resources are used or explicit resources are used. More preferably, the ARI information can designate one of an implicit resource derived from the PDCCH, one or more resource set(s) represented as offsets with respect to the implicit resource, and one explicit resource set. Otherwise, the ARI information can designate one of an implicit resource and a plurality of explicit resource sets (or an explicit resource set and resources determined by offsets with respect to the explicit resource set) derived from the PDCCH. Alternatively, the ARI information can indicate one of an implicit resource derived from the PDCCH, one or more resource set(s) represented as offsets with respect to the implicit resource, and a plurality of explicit resource sets (or an explicit resource set and resources determined by offsets with respect to the explicit resource set).

Figure 14:
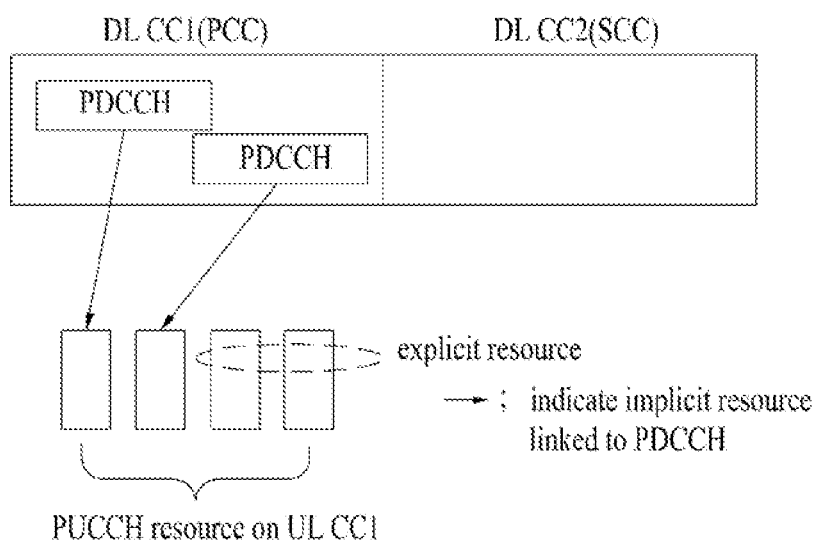

Embodiment 4: Case in which a Plurality of PDCCHs is Transmitted Through a PDCCH Monitoring CC and a Combination of an Implicit Resource and an Explicit Resource is Used for Each PDCCH FIG. 14 illustrates a method of allocating PUCCH resources for ACK/NACK transmission. The present embodiment exemplifies a case in which an implicit PUCCH resource is allocated for a PDCCH that schedules MIMO transmission of 2 codewords transmitted through a PDCCH monitoring CC (e.g. PCC) and an additional explicit PUCCH resource is pre-allocated per PDCCH.

Referring to FIG. 14, the UE can receive a plurality of PDSCH-scheduling PDCCHs through one PDCCH monitoring CC. The figure shows a case in which a plurality of PDCCHs is received on the PCC. The UE receives a PDSCH signal corresponding to each PDCCH. In a MIMO mode, up to 2 codewords can be transmitted through each PDSCH. In the present embodiment, one PUCCH resource linked to each PDCCH can be allocated to the UE for ACK/NACK transmission and 2 PUCCH resources can be pre-allocated in an explicit manner. The UE feeds back a plurality of ACK/NACKs using ACK/NACK channel selection. That is, the UE transmits bit values corresponding to a plurality of ACK/NACKs using one of the plural PUCCH resources.

To reduce the quantity of PUCCH resources necessary for the system, the same explicit PUCCH resource can be allocated to a plurality of UEs. In this case, the explicit PUCCH resource can be changed/indicated using ARI information included in a PDCCH. The ARI information may be included in a PCC PDCCH and/or an SCC PDCCH. The ARI information is preferably included in a PDCCH (e.g. a PDCCH transmitted through an SCC) which is not used to designate an implicit PUCCH resource.

The ARI information can include an offset value used to change an explicit PUCCH resource, for example. In this case, the ARI information can be used to change a PUCCH index (refer to Table 4). A changed cyclic shift, a changed orthogonal cover and/or a changed PRB can be obtained from the changed PUCCH index. In addition the ARI (e.g. offset value) can be used to directly change at least one of a cyclic shift, an orthogonal cover and a PRB. Furthermore, the ARI information can designate different explicit PUCCH resource sets (refer to Table 5). An explicit resource set corresponds to a plurality of explicit resources allocated per PDCCH. For example, the explicit resource set includes a PUCCH resource pair.

A PUCCH resource changed by an ARI may correspond to some of all explicit PUCCH resources. For example, one of 2 explicit PUCCH resources shown in FIG. 13 can be used only for mapping of ACK/NACK information with respect to a PDSCH scheduled on the PCC. In this case, ARI information of the SCC PDCCH may not be applied to the corresponding PUCCH resource. This can avoid generation of an error in an ACK/NACK response to the PDSCH transmitted on the PCC when the UE misses the SCC PDCCH.

When a plurality of SCC PDCCHs is transmitted and explicit PUCCH resources are used for the same, each SCC PDCCH can include ARI information. Here, the SCC PDCCHs may have the same ARI information (e.g. PUCCH resource offset value or PUCCH resource set). Otherwise, the SCC PDCCHs may include independent ARIs.

Alternatively, an implicit resource and an explicit resource may be selectively used using the ARI information for the second PUCCH resource allocated for each PDCCH. For example, the ARI information can indicate whether an implicit resource linked to a corresponding PDCCH is used (embodiment 1) or an explicit resource is used (embodiment 4). Furthermore, the ARI information can designate one of an implicit resource derived from the corresponding PDCCH, one or more resource(s) represented as offsets for the implicit resource and an explicit resource. In addition, the ARI information can designate one of an implicit resource and a plurality of explicit resources (or an explicit resource and resources determined by offsets with respect to the explicit resource) derived from the PDCCH. Otherwise, the ARI information can indicate one of an implicit resource derived from the PDCCH, one or more resource(s) represented as offsets with respect to the implicit resource, and a plurality of explicit resources (or an explicit resource and resources determined by offsets with respect to the explicit resource).

Figure 15:
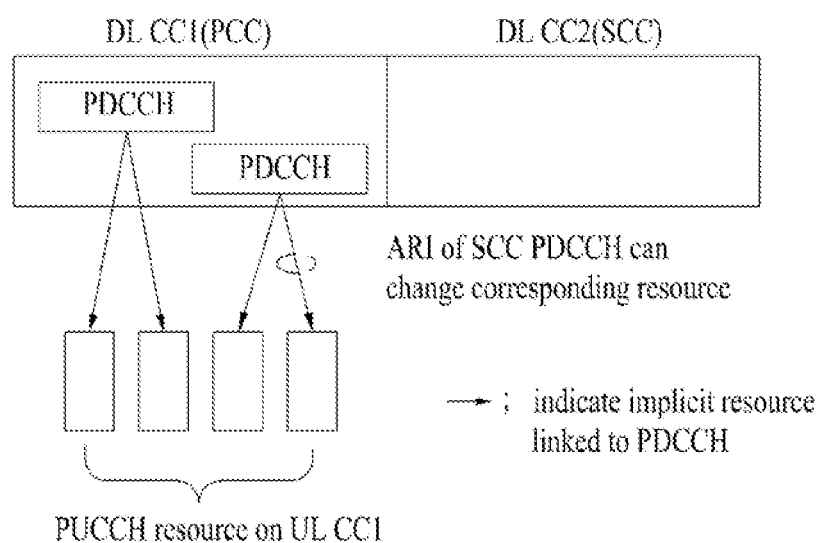

Embodiment 5: Case in which a Plurality of PDCCHs is Transmitted Through a PDCCH Monitoring CC and Implicit Resources are Used for all PDCCHs FIG. 15 illustrates a method of allocating PUCCH resources for ACK/NACK transmission. The present embodiment exemplifies a case in which implicit PUCCH resources are used for all PDCCHs.

Referring to FIG. 15, the UE can receive a plurality of PDSCH-scheduling PDCCHs through one PDCCH monitoring CC. The figure shows a case in which a plurality of PDCCHs is received on the PCC. The UE receives a PDSCH signal corresponding to each PDCCH. In a MIMO mode, up to 2 codewords can be transmitted through each PDSCH. In the present embodiment, 2 PUCCH resources linked to each PDCCH can be allocated to the UE such that the UE can transmit ACK/NACKs for 2 codewords transmitted over each PDSCH. The UE feeds back a plurality of ACK/NACKs using ACK/NACK channel selection. That is, the UE transmits bit values corresponding to a plurality of ACK/NACKs using one of the plural PUCCH resources.

For 2 codewords corresponding to one PDCCH, 2 PUCCH resources linked to 2 CCEs (e.g. first and second CCEs) constituting the corresponding PDCCH can be allocated. For example, the 2 PUCCH resources linked to the PDCCH may be a PUCCH resource linked to the first CCE (i.e. CCE index=$n_{CCE}$) constituting the PDCCH and a PUCCH resource linked to a CCE (i.e. CCE index=$n_{CCE}+1$) contiguous to the first CCE. Here, if the PDCCH is configured of only one CCE, an allocated PUCCH resource may collide with a PUCCH resource used by another UE.

Accordingly, the present embodiment proposes a scheme of changing all PUCCH resources or some of the PUCCH resources (e.g. a PUCCH resource linked to the second CCE) linked to a PDCCH through ARI information signaled through the PDCCH when a plurality of PUCCH resources are allocated by using linkage with one PDCCH resource. For example, it is possible to change all the PUCCH resources or some of the PUCCH resources (e.g. a PUCCH resource linked to the second CCE) linked to the PDCCH by a specific offset using the ARI information. That is, the ARI information can be used for a case in which a PUCCH resource is not changed and a case in which the PUCCH resource is changed by one of one or more offsets values. The figure shows a scheme of changing only one of 2 PUCCH resources linked to an SCC PDCCH using ARI information.

The ARI information may be included only in the PCC PDCCH to change only a PUCCH resource linked to the PCC PDCCH. Otherwise, the ARI information may be included only in the SCC PDCCH to change only a PUCCH resource linked to the SCC PDCCH. When a plurality of SCC PDCCHs is present, ARI information included in each SCC PDCCH can be applied only to PUCCH resources linked to the corresponding SCC PDCCH. That is, ARI information included in the SCC PDCCHs can be independently set.

An ARI (e.g. offset value) can be used to change PUCCH index linked to a PDCCH. Accordingly, a changed cyclic shift, a changed orthogonal cover and/or a changed PRB can be obtained from the changed PUCCH index. In addition the ARI (e.g. offset value) can be used to directly change at least one of a cyclic shift, an orthogonal cover and a PRB.

Alternatively, it is possible to selectively use an implicit resource or an explicit resource using ARI information for all/some PUCCH resources allocated per PDCCH. For example, ARI information can designate one of an implicit resource derived from the corresponding PDCCH, one or more resources represented as offsets with respect to the implicit resource, and one explicit resource. Otherwise, the ARI information can indicate one of an implicit resource and a plurality of explicit resources (or an explicit resource and resources determined by offsets with respect to the explicit resource) which are derived from the PDCCH. Furthermore, the ARI information can designate one of an implicit resource derived from the PDCCH, one or more resources represented as offsets with respect to the implicit resource, and a plurality of explicit resources (or an explicit resource and resources determined by offsets with respect to the explicit resource).

Figure 16:
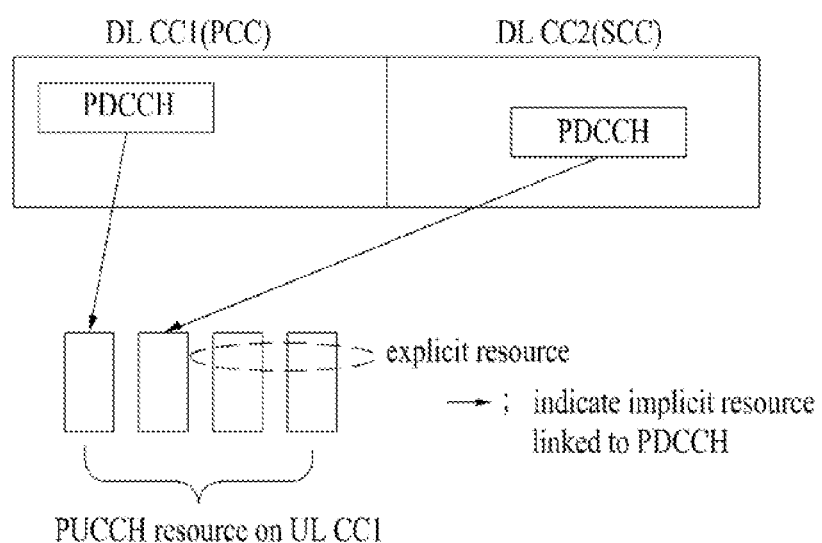

Embodiment 6: Case in which PDCCHs are Transmitted Through a Plurality of PDCCH Monitoring CCs and a Combination of an Implicit Resource and an Explicit Resource is Used for Each PDCCH FIG. 16 illustrates a method of allocating PUCCH resources for ACK/NACK transmission. The present embodiment exemplifies a case in which an implicit PUCCH resource is allocated for each PDCCH that schedules MIMO transmission of 2 codewords transmitted through each DL CC and an explicit PUCCH resource is additionally pre-allocated for each DL CC available for MIMO transmission.

Referring to FIG. 16, the UE can receive PDSCH-scheduling PDCCHs through a plurality of DL CCs. The figure shows a case in which one PDCCH is received on each of a PCC and an SCC. The UE receives a PDSCH signal corresponding to each PDCCH. In a MIMO mode, up to 2 codewords can be transmitted through each PDSCH. In the present embodiment, one PUCCH resource linked to each PDCCH can be allocated to the UE for ACK/NACK transmission and the remaining PUCCH resources can be pre-allocated to the UE in an explicit manner. Then, the UE feeds back a plurality of ACK/NACKs using ACK/NACK channel selection. That is, the UE transmits bit values corresponding to a plurality of ACK/NACKs using one of the plural PUCCH resources.

To reduce the quantity of PUCCH resources necessary for the system, the same explicit PUCCH resource can be allocated to a plurality of UEs. In this case, the explicit PUCCH resource can be changed/indicated using ARI information included in a PDCCH. The ARI information may be included in a PCC PDCCH and/or an SCC PDCCH. The ARI information is preferably included in a PDCCH (e.g. a PDCCH transmitted through an SCC) which is not used to designate an implicit PUCCH resource.

The ARI information can include an offset value used to change an explicit PUCCH resource, for example. In this case, the ARI information can be used to change a PUCCH index (refer to Table 4). A changed cyclic shift, a changed orthogonal cover and/or a changed PRB can be obtained from the changed PUCCH index. In addition the ARI (e.g. offset value) can be used to directly change at least one of a cyclic shift, an orthogonal cover and a PRB. Furthermore, the ARI information can designate different explicit PUCCH resource sets (refer to Table 5). An explicit resource set corresponds to a plurality of explicit resources allocated per PDCCH. For example, the explicit resource set includes a PUCCH resource pair.

A PUCCH resource changed by an ARI may correspond to some of all explicit PUCCH resources. For example, one of 2 explicit PUCCH resources shown in FIG. 13 can be used only for mapping of ACK/NACK information with respect to a PDSCH scheduled on the PCC. In this case, ARI information of the SCC PDCCH may not be applied to the corresponding PUCCH resource. This can avoid generation of an error in an ACK/NACK response to the PDSCH transmitted on the PCC when the UE misses the SCC PDCCH.

When a plurality of SCC PDCCHs is transmitted and explicit PUCCH resources are used for the same, each SCC PDCCH can include ARI information. Here, the SCC PDCCHs may have the same ARI information (e.g. PUCCH resource offset value or PUCCH resource set). Alternatively, the SCC PDCCHs may include independent ARIs.

An ARI transmitted through a PDCCH can change an implicit PUCCH resource linked to the PDCCH. That is, when implicit PUCCH resources linked to PDCCHs transmitted through different DL CCs are not separately secured for the same UL CC, the implicit PUCCH resources may collide. In this case, collision can be prevented using the ARI. Here, ARI information can be included only in a PDCCH transmitted through a DL CC other than the PCC.

Alternatively, an implicit resource or an explicit resource may be selectively used using the ARI information for the second PUCCH resource allocated for each PDCCH. For example, the ARI information can indicate whether an implicit resource linked to a corresponding PDCCH is used (embodiment 1) or an explicit resource is used (embodiment 4). Furthermore, the ARI information can designate one of an implicit resource derived from the corresponding PDCCH, one or more resource(s) represented as offsets for the implicit resource and an explicit resource. In addition, the ARI information can designate one of an implicit resource and a plurality of explicit resources (or an explicit resource and resources determined by offsets with respect to the explicit resource) derived from the PDCCH. Alternatively, the ARI information can indicate one of an implicit resource derived from the PDCCH, one or more resource(s) represented as offsets with respect to the implicit resource, and a plurality of explicit resources (or an explicit resource and resources determined by offsets with respect to the explicit resource).

Figure 17:
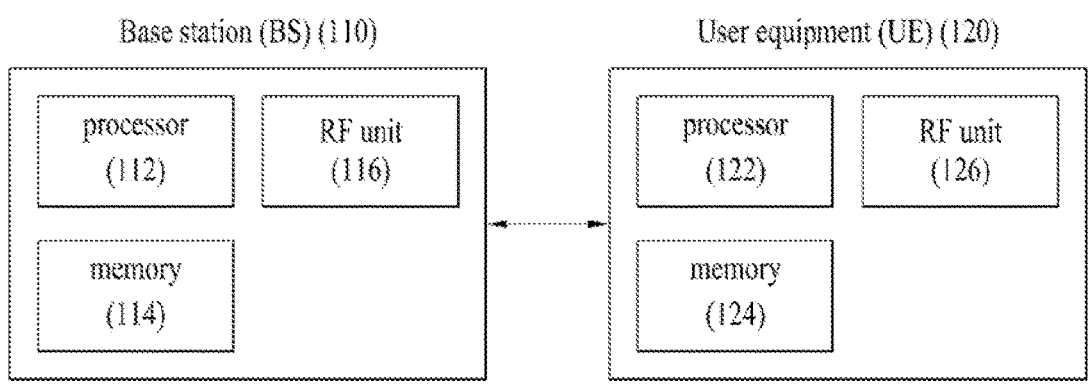
FIG. 17 illustrates a base station (BS) and a user equipment (UE) applicable to an embodiment of the present invention.

FIG. 17 illustrates a BS and a UE applicable to an embodiment of the present invention. When a wireless communication system includes a relay, communication is performed between a BS and the relay on a backhaul link and between the relay and a UE on an access link. The BS or UE shown in FIG. 16 can be replaced by a relay as necessary.

Referring to FIG. 17, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

The invention claimed is:

1. A method for transmitting uplink control information by a communication apparatus configured with a plurality of cells in a wireless communication system, the method comprising:

receiving a Radio Resource Control (RRC) message including Physical Uplink Control Channel (PUCCH) resource allocation information, the PUCCH resource allocation information indicating a plurality of PUCCH resources;

receiving a first Physical Downlink Control Channel (PDCCH) on a primary component carrier and a second PDCCH on a secondary component carrier, each of the primary and secondary components carriers being configured to support transmission of up to 2 transport blocks;

receiving first and second Physical Downlink Shared Channels (PDSCHs) indicated by the first and second PDCCHs respectively;

selecting one of four PUCCH resources according to Hybrid Automatic Repeat request-Acknowledgements (HARQ-ACKs) for transport blocks of the first and second PDSCHs, the four PUCCH resources including:
a first PUCCH resource indicated by a lowest Control Channel Element (CCE) index used for transmission of the first PDCCH,
a second PUCCH resource indicated by the lowest CCE index+1, and
a pair of third and fourth PUCCH resources indicated by Acknowledgement/Negative ACK Resource Index (ARI) information of the second PDCCH, among the plurality of PUCCH resources indicated by the PUCCH resource allocation information; and transmitting a two bit value corresponding to the HARQ-ACKs using the selected PUCCH resource.

2. The method according to claim 1, wherein the primary and secondary component carriers are Multiple Input Multiple Output (MIMO) carriers.

3. A communication apparatus configured to transmit uplink control information when a plurality of cells is configured in a wireless communication system, the communication apparatus comprising:

a radio frequency (RF) unit; and
a processor,
wherein the processor is configured to:
receive a Radio Resource Control (RRC) message including Physical Uplink Control Channel (PUCCH) resource allocation information, the PUCCH resource allocation information indicating a plurality of PUCCH resources,
receive a first Physical Downlink Control Channel (PDCCH) on a primary component carrier and a second PDCCH signal on a secondary component carrier, each of the primary and secondary components carriers being configured to support transmission of up to 2 transport blocks,
receive first and second a plurality of Physical Downlink Shared Channels (PDSCHs) indicated by the first and second PDCCHs respectively,
select one of four PUCCH resources according to Hybrid Automatic Repeat request-Acknowledgements (HARQ-ACKs) for transport blocks of the first and second PDSCHs, the four PUCCH resources including:
a first PUCCH resource indicated by a lowest Control Channel Element (CCE) index used for transmission of the first PDCCH,
a second PUCCH resource indicated by the lowest CCE index+1, and
a pair of third and fourth PUCCH resources indicated by Acknowledgement/Negative ACK Resource Index (ARI) information of the second PDCCH, among the plurality of PUCCH resources indicated by the PUCCH resource allocation information; and transmit a two bit value corresponding to the HARQ-ACKs using the selected PUCCH resource.

4. The communication apparatus according to claim 3, wherein the primary and secondary component carriers are Multiple Input Multiple Output (MIMO) component carriers.

* * * * *